US005370235A

United States Patent [19]

Stahl et al.

[11] Patent Number: 5,370,235
[45] Date of Patent: Dec. 6, 1994

[54] METHOD OF SEPARATING POLYETHYLENE (PE) AND POLYPROPYLENE (PP)

[75] Inventors: Ingo Stahl, Vellmar; Axel Hollstein, Kassel; Ulrich Kleine-Kleffmann; Iring Geisler, both of Bad Hersfeld; Ulrich Neitzel, Kassel, all of Germany

[73] Assignee: Kali und Salz Aktiengesellschaft, Kassel, Germany

[21] Appl. No.: 39,272

[22] PCT Filed: Jul. 4, 1992

[86] PCT No.: PCT/EP92/01614

§ 371 Date: Apr. 9, 1993

§ 102(e) Date: Apr. 9, 1993

[87] PCT Pub. No.: WO93/03852

PCT Pub. Date: Mar. 4, 1993

[30] Foreign Application Priority Data

Aug. 21, 1991 [DE] Germany ............................. 4127574

[51] Int. Cl.⁵ ................................................ B03C 7/00
[52] U.S. Cl. .................................................... 209/127.4
[58] Field of Search .............. 209/3, 10, 11, 12, 127.1, 209/127.2, 127.4, 128–131

[56] References Cited

U.S. PATENT DOCUMENTS

| | | | |
|---|---|---|---|
| 4,379,748 | 4/1983 | Hoogendoorn | 209/11 |
| 4,570,861 | 2/1986 | Zentgraf et al. | 209/127.1 X |
| 4,797,201 | 1/1989 | Küppers et al. | 209/127.4 |
| 4,809,854 | 3/1989 | Tomaszek | 209/10 X |
| 5,115,987 | 5/1992 | Mithal | 209/12 X |
| 5,118,407 | 6/1992 | Beck et al. | 209/129 X |
| 5,234,110 | 8/1993 | Kobler | 209/3 X |
| 5,268,074 | 12/1993 | Brooks et al. | 209/10 X |

FOREIGN PATENT DOCUMENTS

| | | |
|---|---|---|
| 1505274 | 12/1967 | France . |
| 1758756 | 2/1971 | Germany . |
| 3035649 | 4/1982 | Germany . |
| 3227874 | 1/1984 | Germany . |

*Primary Examiner*—David H. Bollinger
*Attorney, Agent, or Firm*—Collard & Roe

[57] ABSTRACT

Plastic mixtures, in particular those of a similar density such as polyethylene and polypropylene, are separated electrostatically, whereby prior to charging, the mixture is subjected to a surface treatment.

20 Claims, No Drawings

METHOD OF SEPARATING POLYETHYLENE (PE) AND POLYPROPYLENE (PP)

The invention relates to a process for the separation of plastic particles of a plastic mixture of plastics of a chemically different type which, however, have an approximately the same density range, for example polyethylene (PE) and polypropylene (PP), by an electrostatic separation process by means of a free-fall separator.

The polyolefins polyethylene (PE) and polypropylene (PP) belong to the mass plastics used most. They, therefore, also represent the predominating portion of the plastics contained in waste. The density of PE lies between 0.92 and 0.97 g/cm$^3$, and the one of PP between 0.9 and 0.91 g/cm$^3$.

Many commodity and one-way articles consist of said plastics. An example thereof are the medical one-way syringes. One-way syringes consist of a cylinder made of polypropylene and a plunger made of polyethylene. After the removal of the injection needle they are discarded as waste and heretofore eliminated predominantly by incineration. On the waste sector, the current trend is toward recycling. In many hospitals there are already pilot projects for the collection and recycling of plastic objects. The plastic quantity of a syringe consists in about equal parts of the plastics PE and PP. There is no corresponding demand for such mixtures, so that only low or no profits at all can be achieved therefor. There are even users who demand a credit for taking them.

As opposed to the above, it is possible to achieve for purely sorted recycling materials profits that are oriented in the price of the new materials and that may come up to 60% of the price of the new material. Consequently it is of interest, economically, to be able to separate such mixtures.

According to the state of the art there are the following possibilities for the separation of such plastic mixtures:

1. Sorting by hand

This method is used again extensively in the field of recycling for lack of better methods even though it is very labor-intensive and thus also uneconomical.

2. Sorting according to density, too, represent a not very successful method because PP and PE have similar densities and separation by means of a water-alcohol mixture with a density of 0.91 has not found any practical application. From this follows that a density separation with water is not possible due to the almost identical density range of the two substances.

The separation of plastic mixtures in a free-fall separator is specified in DE-PS 30 35 649; however, the known process is not usable for separating the above-mentioned plastic mixtures because the different plastics PE and PP are not selectively charged in the triboelectric charging of the plastic mixture.

The consequence thereof is that after passing through the free-fall separator, a considerable amount of medium material is collected, i.e., the plastic particles predominantly have a low charge that is not sufficient for a deflection in the field. The charging is frequently totally unselective.

The invention, therefore, is based on the problem of further developing a process of the type specified at the beginning in such a way that a high degree of purity of the respective type of plastic is achieved especially in the separation of PE and PP, and whereby the resulting quantity of medium material is kept as low as possible.

According to the invention, the problem is solved in that prior to the triboelectric charging, the plastic mixture is subjected to a surface treatment. According to one form of execution, the surface treatment comprises a treatment with mineral acid; according to another form of execution, the plastic mixture is contacted with an alkali lye. In this connection, particularly diluted hydrochloric acid can be considered as the mineral acid, whereby the dilution of the hydrochloric acid is selected in such a way that a pH of about 3 is adjusted.

Preferably diluted soda lye is used as the alkali lye, whereby the dilution of the soda lye is adjusted in such a way that a lye with a pH of about 10 to 12 is obtained.

It has been found in tests that through a surface treatment with the respective substances, it was possible to achieve good separation results in the free-fall separator, which is reflected particularly by a high degree of purity of the fractions but also by a relatively low amount of medium material.

This is seemingly explainable in that the surface of the plastic material is changed by the mineral acid or alkali lye in such a way that a superior triboelectric charging is possible.

Prior to the actual surface treatment, the plastic mixture, which is advantageously crushed to a particle size of under 10 mm, preferably of under 6 mm, is cleaned by water of foreign substances such as, for example, paper. In this connection, it is possible according to a special feature of the invention to add the mineral acid or alkali lye to the cleaning water during the cleaning process, whereby, however, it is necessary to maintain the degree of dilution, which is characterized by the adjustment of the respective pH.

After the cleaning, if necessary with addition of the alkali lye or mineral acid and following, if necessary, a washing of the plastic mixture with clear water, the water proportion of the mixture is reduced to at least about 2% by dehydration aggregates such as, for example, a centrifuge.

Thereafter, a temperature treatment of the plastic mixture is carried out at 70° to 100° C. over a time period of at least 5 minutes.

Said temperature treatment additionally serves for changing the surface in view of a better triboelectric charging of the individual plastic particles.

After said temperature treatment, about 10 to 50 mg fatty acid per kg mixture is added to the plastic mixture in accordance with another advantageous feature of the invention.

It has been found that because of said pretreatment, and in this connection particularly because of the pretreatment with the acid or lye, it suffices if field intensities of only 2 to 3 KV/cm are maintained in the free-fall separator in order to cause the depositing of the plastic particles on the respective electrodes. A suitable example of free-fall separator is that described in DE-PS 3,035,649. With such a comparatively low field intensity, spray discharges are avoided as they can occur with higher field intensities, with the consequence that a possible ignition of the plastic particles or a possible dust explosion is prevented.

The triboelectric charging of the mixture takes place after the temperature treatment at a temperature of 15 to 50° C., preferably of 20° to 35° C., and a relative humidity of the ambient air of about 10 to 40%, preferably of 15 to 20%. The charging itself can take place in a fluidized-bed dryer or in a spiral worm; possible is also charging by pneumatically conveying the mixture.

The process according to the invention is described in the following on the basis of two examples.

EXAMPLE 1

Used syringes from a hospital were ground up on a cutting mill. The shred mixture had a PP-content of 51.1% and a PE-content of 49.9%. The shred mixture was washed, centrifuged, dried for 6 minutes at 80° C. in a fluidized-bed dryer, and, after cooling, charged for 3 minutes at 25° C. and 21% relative huminity in the fluidized bed; however, 50 mg fatty acid/kg was added prior to the charging in the fluidized bed.

The following separation results were obtained:

| Eff. quantities (%) | | | Analysis (degree of purity) | | | | | | Yield (quantity) | | | | | |
|---|---|---|---|---|---|---|---|---|---|---|---|---|---|---|
| | | | % PE | | | % PP | | | PE (%) | | | PP (%) | | |
| P | M | N | P | M | N | P | M | N | P | M | N | P | M | N |
| 46.4 | 7.2 | 46.4 | 96.9 | 55.2 | 3.9 | 3.1 | 47.5 | 92.1 | 89.0 | 7.4 | 3.6 | 2.9 | 6.9 | 90.2 |

Explanation:
P = positive electrode
N = negative electrode
M = medium material

With the used syringe plastic shred mixture, an excellent result was obtained after washing, drying at high temperature conditioning with fatty acid, and charging at slightly increased room temperature.

EXAMPLE 2

A dry PP/PE-shred mixture from ground bottles had a PP-content of about 57% and a PE-content of about 43%. The mixture was first washed with 4% soda lye and then with water, centrifuged, and dried for 20 hours in the air.

The mixture was charged for 3 minutes in a fluidized bed at 25° C. and 11% relative humidity and separated on a free-fall separator.

The following separation results were obtained:

| Eff. quantities (%) | | | Analysis (degree of purity) | | | | | | Yield (quantity) | | | | | |
|---|---|---|---|---|---|---|---|---|---|---|---|---|---|---|
| | | | % PE | | | % PP | | | PE (%) | | | PP (%) | | |
| P | M | N | P | M | N | P | M | N | P | M | N | P | M | N |
| 41.1 | 15.8 | 43.1 | 88.2 | 26.7 | 6.8 | 11.8 | 73.3 | 93.2 | 83.5 | 9.7 | 6.8 | 8.6 | 20.4 | 71.0 |

It was found that washing with diluted soda lye leads to a usable separation result.

EXAMPLE 3

Used syringes from a hospital were ground up on a cutting mill and, after different drying, separated on a free-fall separator.

| | Analysis (degree of purity) | | | | | | | | | Yield (quantity) | | | | | |
|---|---|---|---|---|---|---|---|---|---|---|---|---|---|---|---|
| | Eff. quantities (%) | | | % PE | | | % PP | | | PE (%) | | | PP (%) | | |
| | P | M | N | P | M | N | P | M | N | P | M | N | P | M | N |
| (a) | 36.5 | 28.5 | 35.0 | 83.2 | 40.9 | 14.3 | 16.8 | 59.1 | 85.7 | 64.6 | 24.8 | 10.6 | 11.6 | 31.8 | 56.6 |
| (b) | 29.1 | 63.6 | 7.3 | 40.8 | 44.7 | 40.8 | 44.7 | 40.8 | 59.2 | 27.4 | 65.7 | 6.9 | 30.3 | 62.0 | 7.6 |
| (c) | 50.9 | 19.9 | 26.2 | 42.5 | 51.1 | 46.5 | 57.5 | 48.9 | 53.5 | 47.7 | 22.4 | 29.9 | 53.6 | 17.8 | 28.6 |

Accordingly, it is advantageous to first dry the shred mixture at a comparatively high temperature and to charge it at a moderate temperature.

We claim:

1. Process for the separation of plastic particles of a plastic mixture of plastics of a chemically different type which, however, have approximately the same density range, comprising
   reducing the plastic mixture to a particle size of under 10 mm;
   subjecting the plastic mixture to air at a temperature of 15° C. to 50° C., and a relative humidity of 10 to 40%;
   subjecting the plastic mixture to a surface treatment prior to triboelectric charging;
   subjecting the plastic mixture to triboelectric charging; and
   electrostatically separating the plastic mixture by means of free-fall separator.

2. Process according to claim 1, wherein the plastic mixture has a particle size of under 6 mm.

3. Process according to claim 1, comprising the triboelectric charging of the mixture after the temperature treatment takes place at a temperature of 20° to 35° C., and a relative humidity of the ambient air 15 to 20%.

4. Process according to claim 1, comprising operating the free-fall separator at field intensities of 2 to 3 kV/cm.

5. Process according to claim 1, wherein the plastic mixture is loaded in a fluidized-bed dryer for the triboelectric charging.

6. The process according to claim 1, wherein the plastic mixture is a mixture of polyethylene and polypropylene.

7. Process for the separation of plastic particles of a plastic mixture of plastics of a chemically different type which, however, have approximately the same density range, comprising
   subjecting the plastic mixture to a surface treatment with a mineral acid;
   triboelectric charging of the plastic mixture; and
   electrostatically separating the plastic mixture by means of a free-fall separator 8. Process according to claim 7, comprising using diluted hydrochloric acid as mineral acid.

9. Process according to claim 8, comprising selecting the dilution of the hydrochloric acid in such a way that a pH of about 3 is achieved.

10. Process for the separation of plastic particles of a plastic mixture of plastics of a chemically different type which, however, have approximately the same density range, comprising
   subjecting the plastic mixture to a surface treatment with an alkali lye;
   triboelectric charging of the plastic mixture; and
   electrostatically separating the plastic mixture by means of a free-fall separator.

11. Process according to claim 10, comprising using diluted soda lye as alkali lye.

12. Process according to claim 11, comprising selecting the dilution of

13. Process for the separation of plastic particles of a plastic mixture of plastics of a chemically different type which, however, have approximately the same density range, comprising
   water cleaning the plastic mixture of foreign substances;
   subjecting the plastic mixture to a surface treatment;
   triboelectric charging of the plastic mixture; and
   electrostatically separating the plastic mixture by means of a free-fall separator.

14. Process according to claim 13, wherein the mineral acid or alkali lye is added to the cleaning water.

15. Process according to claim 14, further comprising washing the plastic mixture with clean water after the surface treatment with mineral acid or alkali lye.

16. Process according to claim 13, further comprising drying the mixture to a residual water proportion of less than 2% by weight aggregates.

17. Process according to claim 16, further comprising subjecting the plastic mixture to a temperature treatment at 70° to 100° C. over a time period of at least 5 minutes after the drying to about 2%.

18. Process according to claim 17, further comprising adding 10 to 50 mg fatty acid per kg mixture to the mixture after the temperature treatment.

19. Process for the separation of plastic particles of a plastic mixture of plastics of a chemically different type which, however, have approximately the same density range, comprising
   subjecting the plastic mixture to a surface treatment;
   triboelectric charging the plastic mixture while passing it through a spiral worm; and
   electrostatically separating the plastic mixture by means of a free-fall separator.

20. Process for the separation of plastic particles of a plastic mixture of plastics of a chemically different type which, however, have approximately the same density range, comprising
   subjecting the plastic mixture to a surface treatment;
   triboelectric charging the plastic mixture while conveying it pneumatically; and
   electrostatically separating the plastic mixture by means of a free-fall separator.

* * * * *